United States Patent
Tinari (10) Patent No.: US 10,894,213 B2
(45) Date of Patent: Jan. 19, 2021

(54) GAME APPARATUS, METHOD OF CONTROLLING GAME APPARATUS, AND NON-TRANSITORY COMPUTER-READABLE STORAGE MEDIUM

(71) Applicant: SQUARE ENIX CO., LTD., Tokyo (JP)

(72) Inventor: Abebe Tinari, Osaka (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 16/507,528

(22) Filed: Jul. 10, 2019

(65) Prior Publication Data
US 2020/0316474 A1 Oct. 8, 2020

(30) Foreign Application Priority Data

Apr. 4, 2019 (JP) ................................ 2019-072158

(51) Int. Cl.
| | | |
|---|---|---|
| *A63F 13/00* | (2014.01) | |
| *A63F 9/24* | (2006.01) | |
| *A63F 13/58* | (2014.01) | |
| *A63F 13/57* | (2014.01) | |

(52) U.S. Cl.
CPC .............. *A63F 13/58* (2014.09); *A63F 13/57* (2014.09)

(58) Field of Classification Search
CPC .................................. A63F 13/57; A63F 13/58
See application file for complete search history.

(56) References Cited

U.S. PATENT DOCUMENTS

| | | | | |
|---|---|---|---|---|
| 6,267,674 B1* | 7/2001 | Kondo | .................... | A63F 13/10 463/32 |
| 2004/0046800 A1* | 3/2004 | Emerson | ................. | A63F 13/69 715/810 |
| 2006/0035691 A1* | 2/2006 | Nystrom | ................... | G01D 7/04 463/6 |
| 2007/0149266 A1* | 6/2007 | Arakawa | ................. | A63F 13/58 463/8 |
| 2008/0070655 A1* | 3/2008 | Tanabe | .................... | A63F 13/58 463/7 |

FOREIGN PATENT DOCUMENTS

| | | |
|---|---|---|
| JP | 2006-262965 | 10/2006 |
| JP | 2018-75271 | 5/2018 |

OTHER PUBLICATIONS

Japanese Office Action dated Jun. 22, 2020 issued in Japanese Patent Application No. 2019-072158, with a partial English translation.

(Continued)

*Primary Examiner* — Milap Shah
(74) *Attorney, Agent, or Firm* — Greenblum & Bernstein, P.L.C.

(57) ABSTRACT

It is determined whether or not a first game character operated by a player satisfies a defined condition during a battle between the first game character and a second game character. In response to the defined condition being satisfied by the first game character during the battle between the first game character and the second game character, a control right for controlling a part of the second game character in response to a player operation is acquired.

12 Claims, 6 Drawing Sheets

(56) References Cited

OTHER PUBLICATIONS

"Wario", Super Smash Bros Brawl X, Summary, wiki [online], Dec. 29, 2018, [Jun. 10, 2020 search], URL, https://w.atwiki.jp/wiki13_sumaburax/?cmd=backup&action=show&pageid=49&num=1.

"[Smash Bros SP] [49] Little Mac New things/changes, feature/move list "[Super Smash Bros Brawl Special], Smash Bros SP (Switch) strategy encyclopedia [online], Mar. 25, 2019, [Jun. 10, 2020 search], URL, https://gamepedia.jp/smbr/characters/647.

"Super Smash Bros SP (Smash Bros SP) last minute VIP Wario Attack", Vermillion Market [online] Feb. 11, 2019, [Jun. 10, 2020 search], URL, https://akaebil001.hatenablog.com/entiy/2019/02/11/215508.

[Smash Brothers SP] List of all items, Summary (83 types) (excluding Smash balls/monster balls) [Super Smash Bros Special]. YouTube [online] [video], Dec. 17, 2018, [Jun. 10, 2020 search], (mainly refer to 18:51 to 18:56), URL, https://www.youtube.com/watch?v=Rix76Ib8MM8.

"Made in Wario" Super Smash Bros Brawl Wiki [online] Jan. 3, 2019 [Jun. 10, 2020 search], URL, https://smashwiki.info/index.php?title=Made_IN_Wario&oldid=63675.

Dark Soul, Official Complete Guide, Kadokawa Inc., Apr. 26, 2014, first edition, p. 170.

[Tricks/moves: Consuming Claw], Tales of term dictionary [online], Oct. 4, 2016, [Jun. 10, 2020 search], URL, https://w.atwiki.jp/talesofdic/?cmd=backup&action=show&pageid=9250&num=1.

\* cited by examiner

GAME APPARATUS, METHOD OF CONTROLLING GAME APPARATUS, AND NON-TRANSITORY COMPUTER-READABLE STORAGE MEDIUM

CROSS-REFERENCE TO RELATED APPLICATION(S)

This application claims priority to and the benefit of Japanese Patent Application No. 2019-072158 filed on Apr. 4, 2019, the entire disclosure of which is incorporated herein by reference.

BACKGROUND OF THE INVENTION

Field of the Invention

The present invention relates to a game control technique.

Description of the Related Art

Conventionally, there have been games in which a player operates a player character in a game space (virtual space) to battle an enemy character (Japanese Patent Laid-Open No. 2018-075271). In the battle with the enemy character, if the enemy character is inflicted with equal to or larger than certain amount of damage, the player character wins.

SUMMARY OF THE INVENTION

The applicant of the present invention makes it possible to steal from the enemy character of a right to control of a part of the enemy character in the battle with the enemy character, thereby improving the interesting nature of the game.

According to one aspect of the present invention, there is provided a game apparatus, comprising: a determiner configured to determine whether or not a first game character operated by a player satisfies a defined condition during a battle between the first game character and a second game character; and an acquirer configured to, in response to the defined condition being satisfied by the first game character during the battle between the first game character and the second game character, acquire a control right for controlling a part of the second game character in response to a player operation.

According to another aspect of the present invention, there is provided a method of controlling a game apparatus, the method comprising: determining whether or not a first game character operated by a player satisfies a defined condition during a battle between the first game character and a second game character; and in response to the defined condition being satisfied by the first game character during the battle between the first game character and the second game character, acquiring a control right for controlling a part of the second game character in response to a player operation.

According to still another aspect of the present invention, there is provided a non-transitory computer-readable storage medium for storing a computer program for causing a computer of a game apparatus to function as: a determiner configured to determine whether or not a first game character operated by a player satisfies a defined condition during a battle between the first game character and a second game character; and an acquirer configured to, in response to the defined condition being satisfied by the first game character during the battle between the first game character and the second game character, acquire a control right for controlling a part of the second game character in response to a player operation.

Further features of the present invention will become apparent from the following description of exemplary embodiments (with reference to the attached drawings).

DESCRIPTION OF THE EMBODIMENTS

Hereinafter, embodiments of the present invention will be described with reference to the accompanying drawings.

First Embodiment

In the present embodiment, a game character operated by a player (hereinafter referred to as a "player character") and a game character not operated by a player (a game character operated by a game apparatus or another player—hereinafter referred to as an "enemy character") are arranged in a game space (virtual space). Then, the player operates the player character to battle with the enemy character, but in the present embodiment, in response to the player character satisfying a defined condition during the battle with the enemy character, a part of the enemy character is acquired as an "item (object) that can only be used by the player character to attack the enemy character", or a control right, which is a right to control a part of the enemy character in accordance with a player operation, is acquired.

An item acquired by the player character from the enemy character is not worn by the player character, and is not usable against a character other than the enemy character, and is an item usable only for attacks on the enemy character. When the player acquires the item from the enemy character, the item can be used to attack the enemy character.

When the player character acquires the right to control a part of the enemy character, the player can control the part in accordance with an operation.

Figure 1:
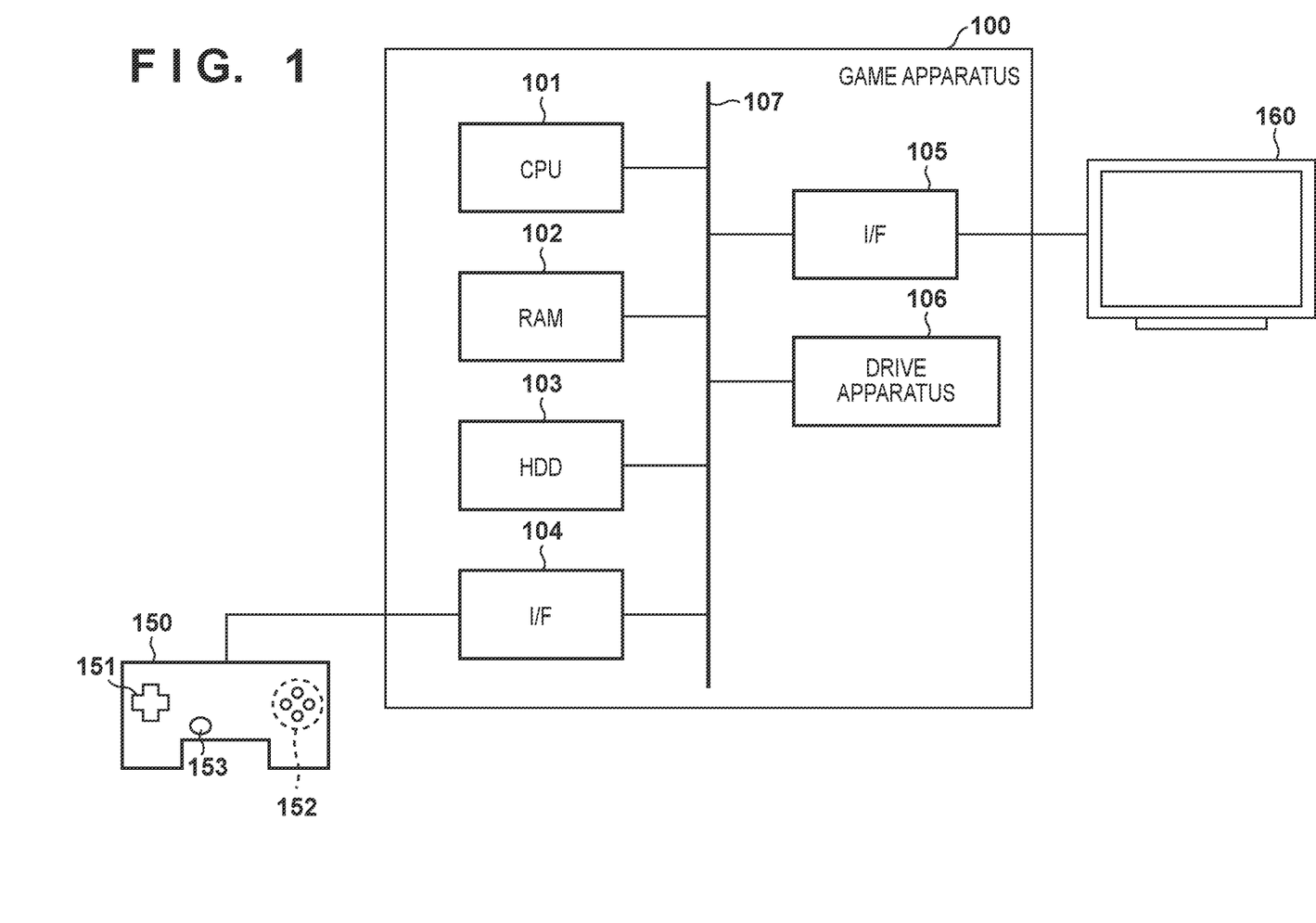
FIG. 1 is a block diagram showing a configuration example of a game system.

First, a configuration example of the game system according to the present embodiment will be described with reference to the block diagram of FIG. 1. A configuration shown in FIG. 1 is an example of a configuration of a game system applicable to the present embodiment, and any configuration may be adopted as long as it can realize various processes described below.

The game system according to the present embodiment includes a controller 150, a game apparatus 100, and a display apparatus 160. In FIG. 1, the controller 150 and the game apparatus 100, and the game apparatus 100 and the display apparatus 160 are connected by wires, respectively, but they may be connected wirelessly.

First, the controller 150 will be described. The controller 150 is used by a player to operate a player character, and includes a cross key 151, a button group 152, and a lever 153.

The cross key 151 is used to indicate the moving direction of the player character. The button group 152 has four buttons, and when pressed, a corresponding instruction is input. The lever 153 can be tilted in an arbitrary direction. The game apparatus 100 is notified of a direction instructed by the player operating the cross key 151, identification information of the button in the button group 152 pressed by the user, and a direction of tilt of the lever 153.

Next, the game apparatus 100 will be described. A CPU 101 executes various processes using computer programs and data stored in a RAM 102. As a result, the CPU 101 controls overall operation of the game apparatus 100, and executes or controls processes described later as those performed by the game apparatus 100.

The RAM 102 has an area for storing computer programs and data loaded from a hard disk drive (HDD) 103 and computer programs and data read by the drive apparatus 106 from a storage medium (such as a CD-ROM, DVD-ROM, or the like) inserted into a drive apparatus 106. Further, the RAM 102 has a work area used when the CPU 101 executes various processes. In this manner, the RAM 102 can appropriately provide various areas.

An operating system (OS) and various computer programs and data are stored in the HDD 103. Computer programs and data stored in the HDD 103 are loaded into the RAM 102 as appropriate under the control of the CPU 101, and are processed by the CPU 101.

An I/F (interface) 104 is an interface for connecting the controller 150 to the game apparatus 100.

The I/F 105 is an interface for connecting the display apparatus 160 to the game apparatus 100.

The drive apparatus 106 reads out a computer program and data of a game recorded in a storage medium such as a CD-ROM or a DVD-ROM, and outputs the computer program and data to a RAM 102. The data of the game recorded in the storage medium includes data of each object constituting the game space, such as data of the player character and the enemy character, data of a game field, and the like. The game data also includes sound or sound effect data, light source attribute (position, color, type, etc.) data, and the like.

The CPU 101, the RAM 102, the HDD 103, the I/F 104, the I/F 105, and the drive apparatus 106 are all connected to a bus 107. In the configuration of FIG. 1, all the processing relating to the game is performed by the CPU 101, but for example, a GPU may be added to the game apparatus 100 to cause the GPU to perform various calculations relating to the game (such as a determination), and processing for rendering game screens.

Next, the display apparatus 160 will be described. The display apparatus 160 is a display apparatus having a liquid crystal screen or a touch panel screen, and displays a game screen which is a result of processing by the game apparatus 100. In FIG. 1, the controller 150, the game apparatus 100, and the display apparatus 160 are separate apparatuses, but two or more of these apparatuses may be collectively used as one apparatus.

Figure 2:
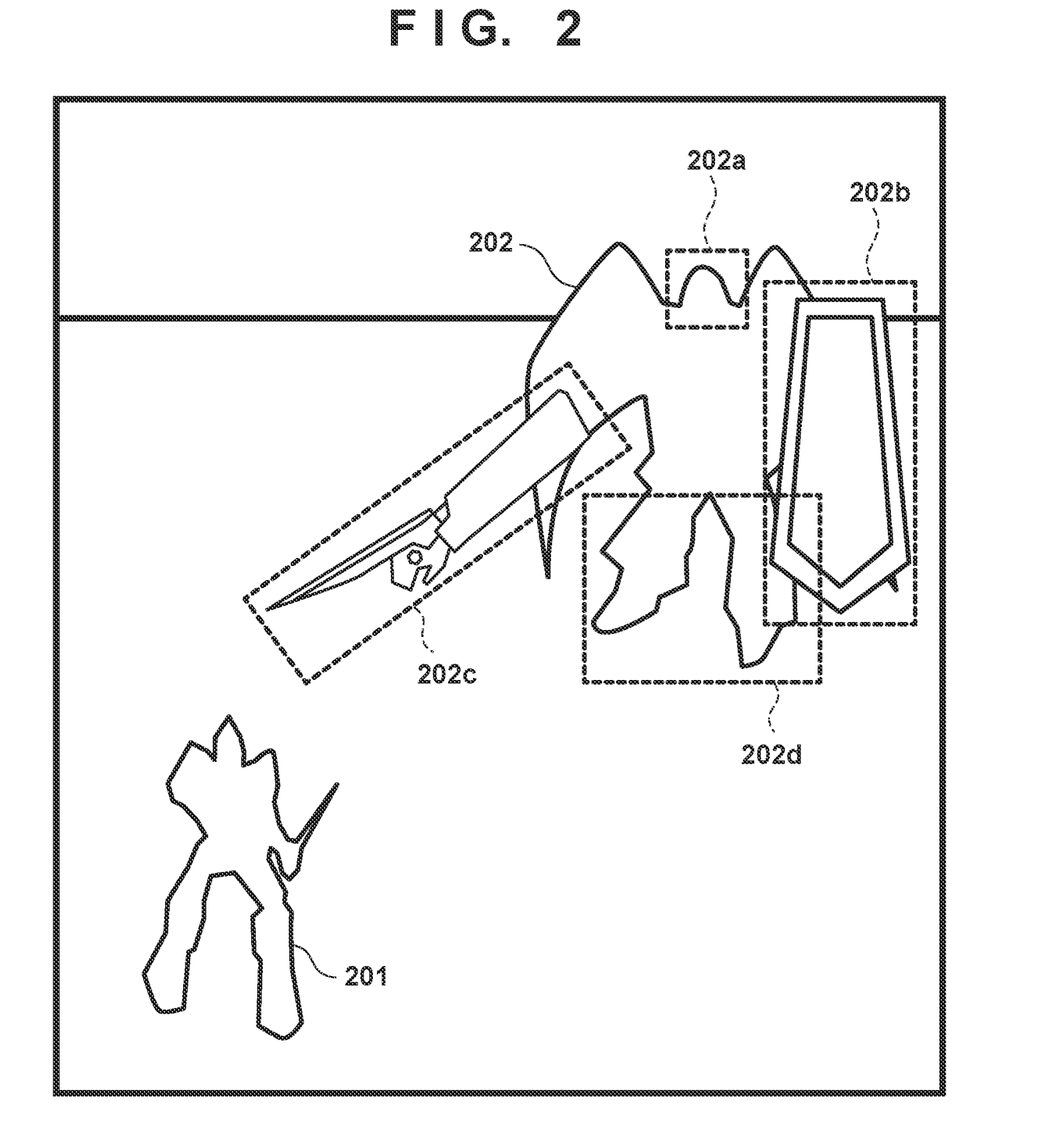
FIG. 2 is a diagram showing an example of a display, on a display apparatus 160, of the game screen in a state in which a player character is in a battle with the enemy character.

FIG. 2 illustrates an example of a display, on the display apparatus 160, of a game screen in a state in which a player character is in a battle with an enemy character. In the game screen of FIG. 2, the player character 201 is in a state in which the player character 201 is battling with the enemy character 202. In the enemy character 202, parts where the player character 201 can attack are defined, and in the example of FIG. 2, a head portion 202a, a shield 202b, a weapon 202c, and a leg portion 202d are defined as "a part of the enemy character 202 where the player character 201 can attack". Here, a "part of the enemy character 202 where the player character 201 can attack" is a part to which damage is inflicted when the player character 201 attacks, and the game apparatus 100 manages the amount of damage for each part.

An operation of a game apparatus 100 in which, in the battle state illustrated in FIG. 2, a player character 201 acquires a part of an enemy character 202 or a right to control the part will be described in accordance with the flowchart of FIG. 6.

<Step S601>

The CPU 101 determines whether or not the player character 201 has entered a state in which stealing is possible with respect to the enemy character 202.

For example, in the case of FIG. 2, since the head portion 202a is a part where attack is always possible (a part where an amount of damage is increased each time an attack is inflicted), each time a user causes the controller 150 to operate and causes the player character 201 to attack the head portion 202a, the CPU 101 increases the amount of damage of the head portion 202a, and when the amount of damage is equal to or larger than a predefined amount, it is determined that the player character 201 is in a state in which it can steal with respect to the head portion 202a.

Further, for example, in the case of FIG. 2, the shield 202b is a part where an attack is possible when the enemy character 202 is in a guard state (the enemy character 202 holds the shield 202b) (a part where the amount of damage is increased upon an attack when the enemy character 202 is in the guard state, and the amount of damage is not increased upon an attack when the enemy character 202 is not in the guard state). Consequently, whenever the user operates the controller 150 and causes the player character 201 to attack the shield 202b when the enemy character 202 is in a guard state, the CPU 101 increases the amount of damage of the shield 202b, and when the amount of damage is equal to or larger than a predefined amount, it is determined that the player character 201 is in a state in which it can steal with respect to the shield 202b.

Further, for example, in FIG. 2, since the leg portion 202d is a part that can always be attacked, each time the user operates the controller 150 to cause the player character 201 to attack the leg portion 202d, the CPU 101 increases the damage amount of the leg portion 202d, and when the damage amount becomes equal to or greater than the predefined amount, it is determined that the player character 201 is in state in which it can steal with respect to the leg portion 202d.

Further, for example, in the case of FIG. 2, the weapon 202c is a part that can be attacked only by an attack method different from a normal attack (a part for which the amount of damage increases when the player character 201 attacks by an attack method different from a normal attack, and for which the amount of damage does not increase even when the player character 201 attacks by a normal attack). Every time the player character 201 attacks in a different manner from a normal attack, the CPU 101 increases the amount of damage to the weapon 202c, and if the amount of damage is equal to or larger than a predefined amount, it is determined that the player character 201 is in a state in which it can steal in relation to the weapon 202c.

For example, in the case of a game character (background object) arranged in a game space as a background rather than as the enemy character 202, it is determined that the player character 201 is in a state in which it can steal in relation to the background object.

In addition, for some game characters other than the enemy character 202 that move in the game space, it is determined that the player character 201 is in a state in which it can steal in relation to the game character when the amount of damage is equal to or larger than a predefined amount, similarly to the head portion 202a and the leg portion 202d.

When it is determined that the result of such a determination is that the player character 201 is in a state in which it can steal with respect to the enemy character 202, the process proceeds to step S602, and when it is not determined that the player character 201 is in a state in which it can steal with respect to the enemy character 202, the process returns to step S601.

<Step S602>

The CPU 101 determines whether or not a value of a core gauge of the player character 201 is equal to or larger than a predefined value (parameter value). The value of the core gauge of the player character 201 is increased or decreased in accordance with various actions of the player character 201 during the game, and is increased by, for example, inflicting damaging on an enemy game character, conversely receiving damage from an enemy game character, or acquiring an appropriate item. The condition for increasing or decreasing the value of the core gauge is not limited to a specific condition.

When the result of such a determination is that the value of the core gauge of the player character 201 is equal to or larger than the predefined value, the process proceeds to step S603, and when the value of the core gauge of the player character 201 is less than the predefined value, the process returns to step S601.

<Step S603>

The CPU 101 determines whether or not the part of the enemy character 202 in relation to which it has become possible for the player character 201 to steal (part for which stealing is possible) is located at a defined distance or less from the player character 201. When the result of this determination is that the part for which stealing is possible is located within the defined distance of the player character 201, the process proceeds to step S604, and when the part for which stealing is possible is not located within the defined distance from the player character 201, the process returns to step S601.

<Step S604>

The CPU 101 displays a marker at or near the position of the part for which stealing is possible displayed on the game screen. The CPU 101 also displays an object indicating a value of the core gauge on the game screen.

Figure 3:
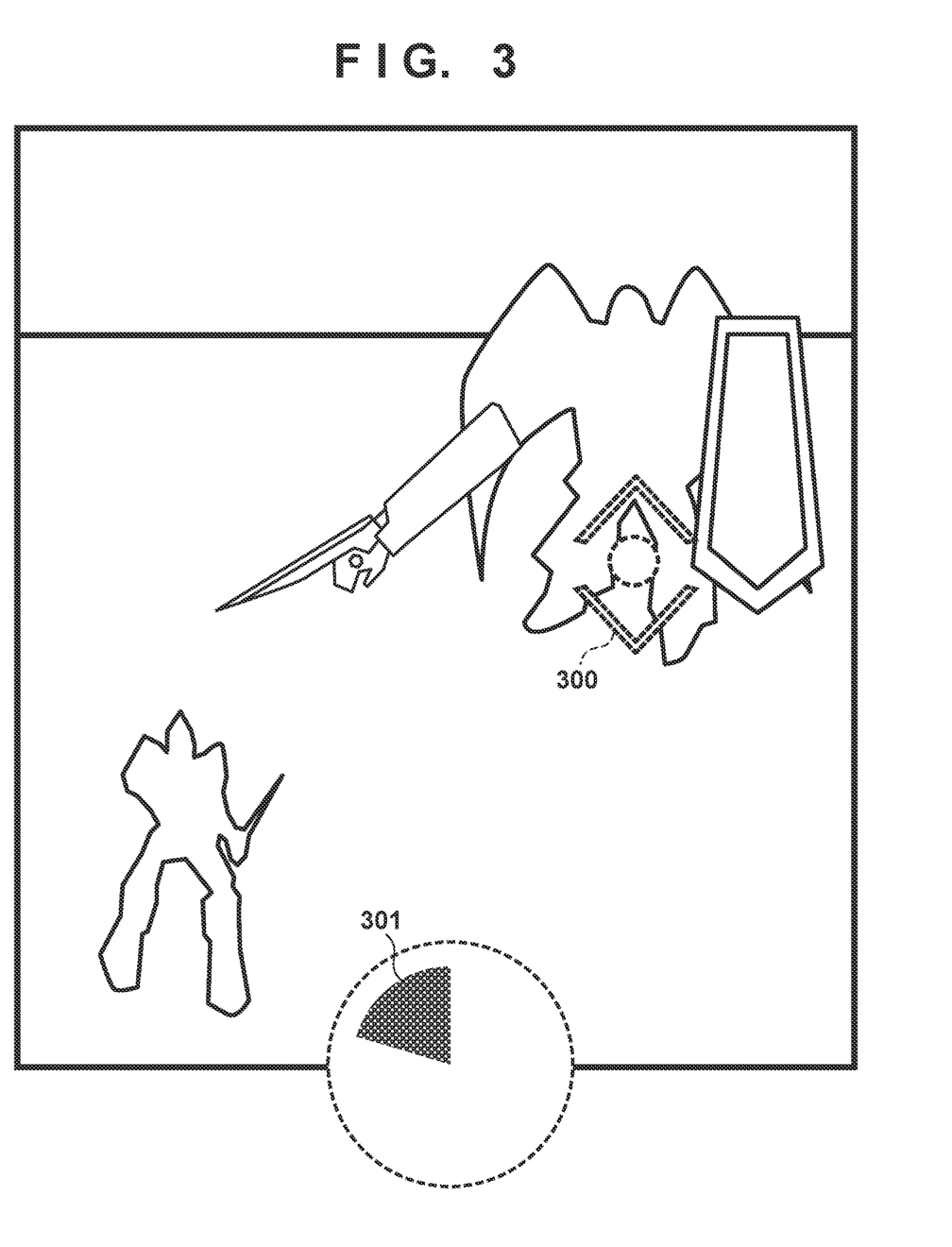
FIG. 3 is a diagram showing an example of a display of a marker and an example of a display of an object indicating a value of a core gauge on the display apparatus 160.

An example of a display of a marker and an example of a display of an object indicating a value of a core gauge on the display apparatus 160 are illustrated in FIG. 3. In FIG. 3, when the part for which stealing is possible is the leg portion 202d, a marker 300 is displayed in near the leg portion 202d.

When there are a plurality of parts for which stealing is possible, one of them is selected, and a marker is displayed at or near the position of the selected part, and it is made to be the target thereafter. The criteria for the selection are not limited to a specific criterion, but, for example, a part for which stealing is possible that is closer to the center of the game screen, a part for which stealing is possible that is closer to the viewpoint position of the game, or a defined type of part for which stealing is possible may be selected.

In FIG. 3, an object indicating the value of the core gauge is displayed as a fan-shaped object 301. Assuming that the maximum value that can be taken as the value of the core gauge is M, when the current value of the core gauge is m, the fan-shaped object 301 having a center angle θ of 360×(m/M) degrees is displayed.

<Step S605>

Figure 4:
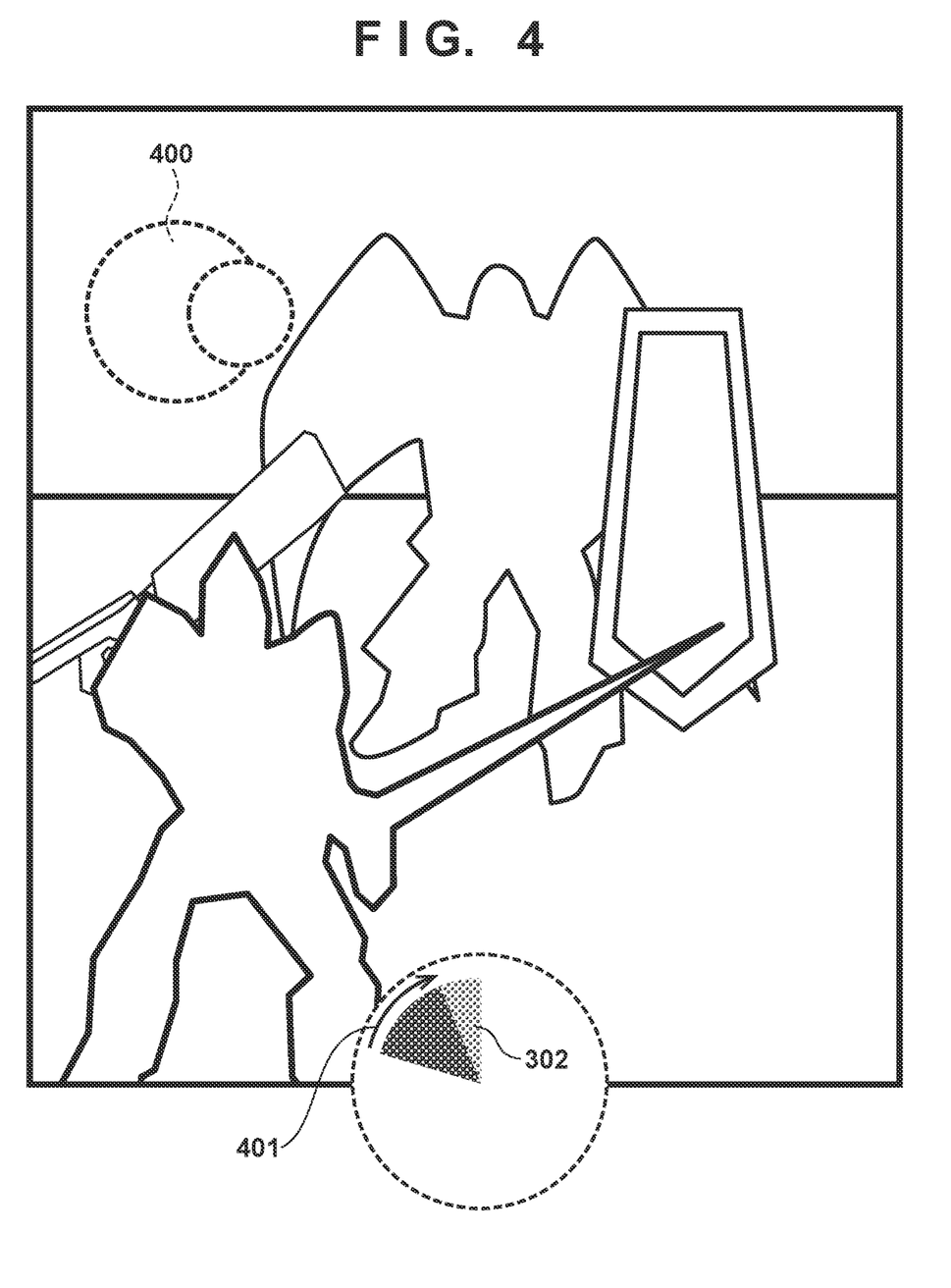
FIG. 4 is a diagram showing an example of a display of an indication object on the display apparatus 160.

The CPU 101 displays on the game apparatus an object (an indication object) for indicating to the user a direction in which to tilt the lever 153. FIG. 4 is a diagram showing an example of a display of an indication object on the display apparatus 160.

In FIG. 4, an indication object 400 is for indicating tilting of the lever 153 to the right, and if the user sees that and tilts the lever 153 to the right correctly, the CPU 101 sets a reduction factor as described below to 1.5. If the user sees it and tilts the lever 153 close to the right (within a threshold range of the right side) incorrectly but mostly correctly, the CPU 101 sets the reduction ratio as described below is set to 1.0. If the user sees it and tilts the lever 153 in a direction that is greatly deviating from the right (outside of a threshold range from the right side) incorrectly, the CPU 101 sets the reduction factor as described below is set to 0.5. Since the indication object is switched to an indication object for instructing a different tilt direction every predetermined amount of time, each time, the player determines the tilt direction of the lever 153 and tilts the lever 153. In each case, the CPU 101 changes the reduction factor.

<Step S606>

The CPU 101 measures the elapsed time from the timing of transitioning from step S604 to step S605 using its own internal timer, and determines whether or not the measured elapsed time exceeds a defined time (i.e., whether or not a time limit is reached). The defined time may be the same for all parts, or may be different for each part.

Figure 6:
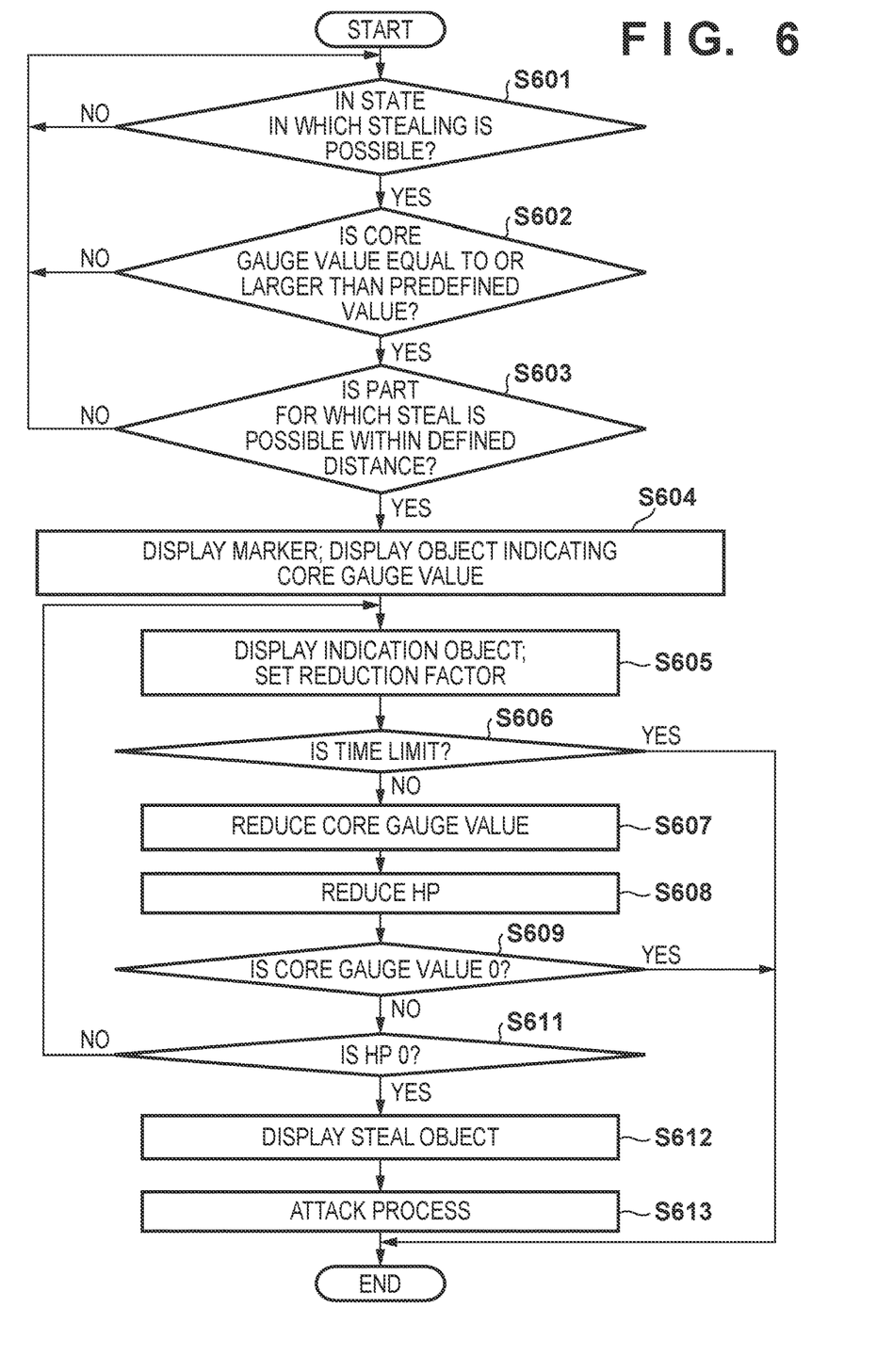
FIG. 6 is a flowchart showing an operation of a game apparatus 100 in which a player character 201 acquires a part of an enemy character 202 or a right to control the part.

As a result of this determination, when the elapsed time exceeds the defined time, the processing according to the flowchart of FIG. 6 ends. On the other hand, when the elapsed time does not exceed the defined time, the process proceeds to step S607.

<Step S607>

The CPU 101 reduces the value of the core gauge in units of a predefined amount. When the value of the core gauge is reduced, the above described center angle θ is reduced, so that the object 301 being displayed is updated to an object 302 whose center angle θ is reduced as indicated by an arrow 401 in FIG. 4.

<Step S608>

The CPU 101 reduces the parameter value (hereinafter referred to as HP) indicating a life force of the part for which stealing is possible in units of a predefined amount, but the predefined amount is the result of multiplying the above-described reduction factor with a default amount. It is assumed that the initial value of HP is determined in advance for each part. The initial value of HP may be the same for all parts, or may be different for each part.

<Step S609>

The CPU 101 determines whether the core gauge value has reached 0. When the result of this determination is that the value of the core gauge became 0, the processing according to the flowchart of FIG. 6 ends. On the other hand, when the value of the core gauge is not 0, the process proceeds to step S611.

<Step S611>

The CPU 101 determines whether HP has reached 0. When the result of this determination is that HP became 0, the process proceeds to step S612, and when HP is not 0, the process returns to step S605.

<Step S612>

Figure 5:
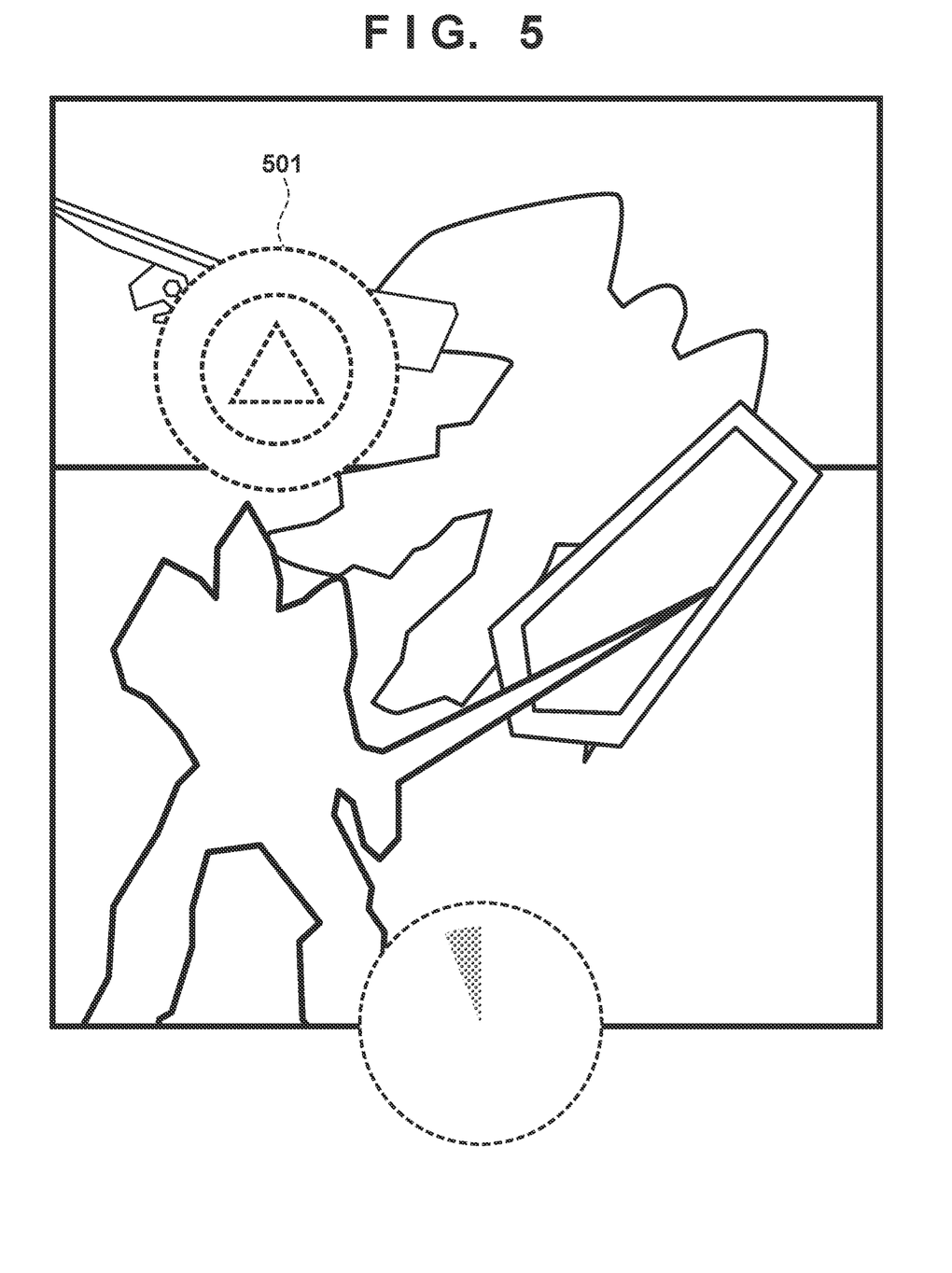
FIG. 5 is a diagram showing an example of a display of a stolen object on the display apparatus 160.

The CPU 101 determines that the steal succeeded with respect to the part for which stealing is possible, and displays an object indicating something to that effect (a steal object) on the game screen. An example of a display of a steal object on the display apparatus 160 is illustrated in FIG. 5. When the user presses one of the buttons included in the button group 152 (in the example of FIG. 5, a button in which there is a triangle mark which the steal object 501 indicates), the process proceeds to step S613.

<Step S613>

The CPU 101 performs an attack process on the enemy character 202 using the part for which stealing is possible. Here, depending on the part for which stealing is possible, the CPU 101 may acquire as an item that the player character 201 can use only for an attack on the enemy character 202, or may acquire a control right to control in accordance with player operations.

For example, when the part for which stealing is possible is the weapon 202c or the shield 202b, the weapon 202c or the shield 202b is acquired (stolen) from the enemy character 202 as an item that can be used only by the player character 201 to attack the enemy character 202. Then, when the player character 201 is attacking the enemy character 202, when the player operates the controller 150 to input an instruction to use the acquired item, the player character 201 uses the acquired item to carry out an additional attack against the enemy character 202.

Further, for example, when the part for which stealing is possible is the leg portion 202d, the player character 201 acquires a control right by which it can control the leg portion 202d. In this case, the player can use the controller 150 to operate the player character 201 to pull the leg portion 202d to perform an attack that knocks down the enemy character 202. The method of attack by the player character 201 corresponding to the part for which stealing is possible for which the control right was acquired is not limited to this example.

Second Embodiment

The numerical values, the content of the user operation, and the content to be displayed used in the first embodiment are examples, and are not intended to be limiting. For example, it is assumed that the shield 202b is a part that can be attacked when the enemy character 202 is in a guard state. However, the conditions in which attack is possible vary depending on the part. Further, for example, the shape, arrangement position, and method for displaying a marker are not limited to the above examples, and character information may be displayed instead of or in addition to the marker. In the above description, the "part" is described as being a part of the enemy character 202, but it may be a game character moving in the background object or in the game space. The game system according to the first embodiment may use a personal computer (PC) instead of the game apparatus 100.

In the first embodiment, an item acquired by the player character from the enemy character is an item that can be used only for an attack on the enemy character, but limitation is not made to "only for an attack on the enemy character" and the item may be used for other attacks.

Further, in the first embodiment, when both of a first condition that the value of the core gauge is equal to or larger than a predefined value (step S602) and that the part for which stealing is possible is within a defined distance (step S603), and a second condition that the HP becomes 0 (step S611) are satisfied, it is determined that stealing is successful for the part for which stealing is possible (a condition for stealing for the part for which stealing is possible is satisfied); however, limitation is not made to this, and for example, it may be determined that stealing is successful for the part for which stealing is possible if the first condition is satisfied.

Alternatively, the value of the core gauge may be represented by a number of blocks, and the number of blocks corresponding to the current value of the core gauge may be displayed on the display screen of the display apparatus 160. The number of blocks to be displayed is incrementally increased—for example, one, two, three, . . . —by attacking an enemy character. Here, the number of blocks corresponding to the maximum value of the core gauge is 5.

At this time, if the enemy character is a minor bad guy character, it is determined in step S602 whether or not the number of blocks is equal to or larger than 1, and if the number of blocks is equal to or larger than 1, the process proceeds to step S603, and if the number of blocks is less than 1, the process returns to step S601.

At this time, if the enemy character is a mid-level character, it is determined in step S602 whether or not the number of blocks is equal to or larger than 3, and if the number of blocks is equal to or larger than 3, the process proceeds to step S603, and if the number of blocks is less than 3, the process returns to step S601.

At this time, if the enemy character is a boss character, it is determined in step S602 whether or not the number of blocks is equal to or larger than 5, and if the number of blocks is equal to or larger than 5, the process proceeds to step S603, and if the number of blocks is less than 5, the process returns to step S601.

Some or all of the configurations described in the first embodiment and the second embodiment may be used in combination as appropriate. Some or all of the first embodiment and the second embodiment may be used selectively.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, a game apparatus and a method of controlling a game apparatus according to the present invention are realizable by a program executing the methods on one or more computers. The program is providable/distributable by being stored on a computer-readable storage medium or through an electronic communication line.

What is claimed is:

1. A game apparatus configured to execute a game including a first game character and a second game character, the game apparatus comprising:

a processor serving as:

a management unit configured to manage, for each of a plurality of parts of the second game character which are preset in advance as parts of the second game character where the first game character operated by a player can attack, damage amount increased by an attack by the first game character;

a first determination unit configured to determine that a part of the second game character whose damage amount is equal to or more than a predefined amount among the plurality of parts of the second game character is a part for which stealing is possible;

a second determination unit configured to determine whether or not a first condition that a parameter value for the first game character is equal to or larger than a predefined value and that the part for which stealing is possible is located within a defined distance range of the first game character is satisfied;

a third determination unit configured to determine, in a case where a player operation is performed after the first condition is satisfied during a battle between the first game character and the second game character, that the part for which stealing is possible is an object that the first game character can use; and a processing unit configured to control the part for which stealing is possible in response to the player operation, in a case where the player operation is performed after it is determined that the part for which stealing is possible is the object that the first game character can use, wherein the processing unit does not control the part for which stealing is possible in response to the player operation, if the player operation is performed before it is determined that the part for which stealing is possible is the object that the first game character can use.

2. The game apparatus according to claim 1, wherein the third determination unit determines that the part for which stealing is possible is the object that the first game character can use in an attack on the second game character, in a case where the player operation is performed after the first condition is satisfied during the battle between the first game character and the second game character.

3. The game apparatus according to claim 2, wherein the processing unit, in a case where the first game character attacks the second game character, performs an additional attack on the second game character using the part for which stealing is possible, in a case where the player operation is performed after it is determined that the part for which stealing is possible is the object that the first game character can use.

4. The game apparatus according to claim 1, wherein the third determination unit determines whether or not, a second condition that a parameter value indicating a life force for the part for which stealing is possible, which continues to be reduced, from an initial value being preset in advance, after the first condition is satisfied, becomes 0 is satisfied, and determines that the part for which stealing is possible is the object that the first game character can use in a case where the second condition is satisfied.

5. The game apparatus according to claim 4, wherein the processor further serves as a control unit configured to control an amount of reduction of a parameter value indicating the life force, in accordance with a result of comparison between an operation indicated to the player and the player operation performed by the player in accordance with the indication.

6. The game apparatus according to claim 1, wherein the plurality of parts are parts, which the first game character can attack at all times.

7. The game apparatus according to claim 1, wherein the plurality of parts are parts, which the first game character can attack only when a state of the second game character is a defined state.

8. The game apparatus according to claim 1, wherein the plurality of parts are parts, which the first game character can attack only by a defined attack method.

9. The game apparatus according to claim 1, further comprising a display unit configured to display a marker when the first condition is satisfied.

10. The game apparatus according to claim 1, wherein the parameter value for the first game character is continuously reduced after the first condition is satisfied.

11. A method of controlling a game apparatus configured to execute a game including a first game character and a second game character, the method comprising:

managing, by a processor, for each of a plurality of parts of the second game character which are preset in advance as parts of the second game character where the first game character operated by a player can attack, damage amount increased by an attack by the first game character;

first determining, by the processor, that a part of the second game character whose damage amount is equal to or more than a predefined amount among the plurality of parts of the second game character is a part for which stealing is possible;

second determining, by the processor, whether or not a first condition that a parameter value for the first game character is equal to or larger than a predefined value and that the part for which stealing is possible is located within a defined distance range of the first game character is satisfied;

third determining, by the processor, in a case where a player operation is performed after the first condition is satisfied during a battle between the first game character and the second game character, that the part for which stealing is possible is an object that the first game character can use; and controlling, by the processor, the part for which stealing is possible in response to the player operation, in a case where the player operation is performed after it is determined that the part for which stealing is possible is the object that the first game character can use, wherein the part for which stealing is possible is not controlled in response to the player operation, if the player operation is performed before it is determined that the part for which stealing is possible is the object that the first game character can use.

12. A non-transitory computer-readable storage medium for storing a computer program for causing a computer of a game apparatus, which is configured to execute a game including a first game character and a second game character, to function as:

a management unit configured to manage, for each of a plurality of parts of the second game character which are preset in advance as parts of the second game character where the first game character operated by a player can attack, damage amount increased by an attack by the first game character;

a first determination unit configured to determine that a part of the second game character whose damage amount is equal to or more than a predefined amount among the plurality of parts of the second game character is a part for which stealing is possible;

a second determination unit configured to determine whether or not a first condition that a parameter value for the first game character is equal to or larger than a predefined value and that the part for which stealing is possible is located within a defined distance range of the first game character is satisfied;

a third determination unit configured to determine, in a case where a player operation is performed after the first condition is satisfied during a battle between the first game character and the second game character, that the part for which stealing is possible is an object that the first game character can use; and a processing unit configured to control the part for which stealing is possible in response to the player operation, in a case where the player operation is performed after it is determined that the part for which stealing is possible is the object that the first game character can use, wherein the processing unit does not control the part for which stealing is possible in response to the player operation, if the player operation is performed before it is determined that the part for which stealing is possible is the object that the first game character can use.

* * * * *